United States Patent
Labutov et al.

(10) Patent No.: US 10,672,293 B2
(45) Date of Patent: Jun. 2, 2020

(54) COMPUTER SYSTEM METHODS FOR GENERATING COMBINED LANGUAGE CONTENT

(71) Applicant: Cornell University, Ithaca, NY (US)

(72) Inventors: Igor Labutov, Ithaca, NY (US); Hod Lipson, Ithaca, NY (US)

(73) Assignee: Cornell University, Ithica, NY (US)

( * ) Notice: Subject to any disclaimer, the term of this patent is extended or adjusted under 35 U.S.C. 154(b) by 525 days.

(21) Appl. No.: 14/775,851

(22) PCT Filed: Mar. 14, 2014

(86) PCT No.: PCT/US2014/029359
§ 371 (c)(1),
(2) Date: Sep. 14, 2015

(87) PCT Pub. No.: WO2014/144800
PCT Pub. Date: Sep. 18, 2014

(65) Prior Publication Data
US 2016/0027333 A1    Jan. 28, 2016

Related U.S. Application Data

(60) Provisional application No. 61/789,950, filed on Mar. 15, 2013.

(51) Int. Cl.
*G09B 19/06* (2006.01)
*G06F 40/30* (2020.01)
*G06F 40/40* (2020.01)
*G06F 40/44* (2020.01)

(52) U.S. Cl.
CPC .............. *G09B 19/06* (2013.01); *G06F 40/30* (2020.01); *G06F 40/40* (2020.01); *G06F 40/44* (2020.01)

(58) Field of Classification Search
CPC ...................................................... G09B 19/06
USPC ......................................................... 434/157
See application file for complete search history.

(56) References Cited

U.S. PATENT DOCUMENTS

| | | | | |
|---|---|---|---|---|
| 2011/0097693 | A1* | 4/2011 | Crawford | G09B 5/065 434/157 |
| 2011/0159467 | A1* | 6/2011 | Peot | A61B 3/113 434/157 |
| 2011/0307241 | A1* | 12/2011 | Waibel | G10L 15/265 704/2 |

OTHER PUBLICATIONS

Solorio, T. et al. Learning to Predict Code-Switching Points, Proceedings of the Conference on Empirical Methods in Natural Language Processing, Association for Computational Linguistics, Oct. 2008, Retrieved from the Internet: <URL:http://ww.aclweb.org/anthology/D08-1102>; pp. 973-981.

(Continued)

*Primary Examiner* — Thomas J Hong
(74) *Attorney, Agent, or Firm* — Valauskas Corder LLC

(57) ABSTRACT

Natural language learning in context is provided by generating combined text of a user's native tongue and language to be learned. The combined text is generated based on elements of code-switching including syntax and semantics. Combining text based on elements of code-switching maximizes the learnability or the likelihood of retaining certain text of a foreign language.

13 Claims, 3 Drawing Sheets

(56) References Cited

OTHER PUBLICATIONS

Yatskar, M. et al., For the sake of simplicity: Unsupervised extraction of lexical simplifications from Wikipedia, Human Language Technologies: The 2010 Annual Conference of the North American Chapter of the Association for Computational Linguistics, Association for Computational Linguistics, Aug. 11, 2010, Retrieved from the Internet: <URL:htt://arxiv.org/pdf>; pp. 365-368.

* cited by examiner

COMPUTER SYSTEM METHODS FOR GENERATING COMBINED LANGUAGE CONTENT

CROSS-REFERENCE TO RELATED APPLICATIONS

This application claims the benefit of priority to U.S. Provisional Application No. 61/789,950, filed Mar. 15, 2013, which is incorporated by reference in its entirety.

FIELD OF THE INVENTION

The invention relates generally to linguistics. More specifically, the invention relates to foreign language learning system and methods that combine two or more languages in an interactive way, based on elements of code-switching.

BACKGROUND OF THE INVENTION

Learning a foreign language has been a universal quest for many. This quest is more prevalent and important today than ever before. As the global community becomes more interdependent, as international travel and commerce become more the norm, and as the world becomes more linked by the Internet, being able to communicate with people from other nations and cultures is becoming more of a necessity and less of a scholarly quest.

As an example, the English language has become the international language of business such that learning English has taken on prerequisite status in countries around the world. As another example, many individuals desire to learn a second language to satisfy personal or career goals.

The process of learning a foreign language includes a variety of approaches such as classroom instruction using face-to-face interaction and textual materials, flash cards, and self-instruction using media such as audio or video tapes. With the advent of personal computing, foreign language instructional software is readily available. However, the instructional software is typically transpositions of the previously and currently available approaches such as flash cards augmented with images or acoustics.

One traditional approach to language learning relates to a simple and effective method for learning a foreign language by reading literature in that language. However, the need to constantly refer to a dictionary often makes what should be an enjoyable experience tedious, thus discouraging the reader. One solution to this problem involves printing the foreign language text and its familiar language translation on opposing pages of a book so that quick reference may be had to the translation. However, the relatively extensive eye movement required to refer to the translation interrupts the reading of the foreign language text sufficiently to destroy the flow of the reading process.

Another approach to language learning relies on rote memorization or artificially crafted sentences to elicit word learning by random switching of words to create a fused sentence. Random switching of words, however, fails to consistently work well. First, the resultant mixed grammar of the fused sentence must obey syntactic constraints of both languages. Second, continuity of the text breaks if the words in the foreign language cannot be inferred from context easily.

Another approach to language learning is known as Language Immersion, which is used to randomly translate parts of text appearing on the Internet. According to Language Immersion, a user may select a desired level of translation according to novice, intermediate and fluent. Language Immersion, however, is not applicable to mediums other than text such as audio. Furthermore, Language Immersion is not very complex and fails to consider user feedback in order to customize the content presented to the user.

The currently available foreign language instructional approaches fail to utilize the skill of code-switching (also known as code-mixing) used by bilingual or multilingual individuals. Code-switching is the alternation between two or more languages in a single sentence. More specifically, code-switching is the use of more than one language in a manner consistent with the syntax and semantics of each language. Syntax refers language structure or the arrangement of words and phrases to create well-formed content such as sentences in a language. Semantics relates to the meaning of words and systematic organization of sounds in languages, or phonology.

The invention satisfies the need for an improved language learning approach by utilizing elements of code-switching to generate content from which a user can learn from context. The invention optimizes the content generated by considering the user's preferences and/or current proficiency level of the language to be learned.

SUMMARY OF THE INVENTION

The invention relates to implicitly learning a foreign language by combining two or more languages based on elements of code-switching. According to the invention, mixing two or more languages produces content that is a fusion at least two languages, for example, one language is the user's native tongue in which the user is fluent, and another language is one in which the user is not fluent or the language that the user wishes to learn. The invention generates natural language narrative or combined content by blending a user's native tongue and a language to be learned based on elements of code-switching, by performing complete text-wide optimization to account for the user's estimated progression of language acquisition though-out the reading. This facilitates rapid natural language learning in context. The combined content may be static content or dynamic content that changes, for example real-time, based on a user's preferences and/or current language proficiency. Combined content—either static or dynamic—may be determined based on feedback received by the system from the user.

It had been found that code-mixing tends to happen on syntactic boundaries of the two languages—namely where the syntax elements and semantic elements of the two languages agree. Given two texts that are translations of each other, combined content is generated that is parameterized and tuned to the user's ability.

According to the invention, two or more languages are combined based on natural constraints inspired by social and linguistic studies of code-switching. The invention further determines which words to mix and where in order to maximize the objective of learning the words from context, accounting for the estimated progression of the user's understanding of new words and syntax.

Most importantly, the invention maximizes the performance for each specific user using feedback such that an advantage of the invention is personalized language learning with increased efficiency. Specifically, the system generates the immersion level of the combined content based on feedback pertaining to the user's current knowledge of the foreign language. For example, a user with a rudimentary understanding of a foreign language may have a low immersion level with only a few words replaced.

Feedback may be either explicit or implicit and used to ascertain whether or not the user is familiar with the word in terms of meaning. Explicit feedback is that received from the user such as a selection of input as to whether or not the user knows the meaning of the word. Implicit feedback is that received from the user through self-paced or controlled reading speed, number of page turns within a specified period of time, eye-tracking such as gaze saccades, and facial expression monitoring.

The invention aligns text of each language, and replaces words in context in order to maximize the learnability—the likelihood of retaining certain text—of the not fluent language. The position or "where" in the content words of each language appears is determined by analyzing syntax elements and semantic elements according to processes that mimic those bilingual individuals use in code-switching. Syntax and semantics are also analyzed with an objective to maximize learnability of the foreign language for each user.

Advantages of the invention include, but are not limited to, using feedback from the user to customize immersion level, using language structure or syntax to optimize text replacements, and using existing parallel texts to merge content. Additionally, the invention is advantageous in that it can be applied to multiple media files including, but not limited to, music, pictures, and videos.

The invention and its attributes and advantages may be further understood and appreciated with reference to the detailed description below of one contemplated embodiment, taken in conjunction with the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention.

DETAILED DESCRIPTION OF THE INVENTION

The invention generates natural language narrative or combined content by blending a user's native tongue and a language to be learned based on elements of code-switching. This facilitates natural language learning in context. The combined content may be static content or dynamic content that changes, for example real-time, based on a user's preference and/or current language proficiency.

Figure 1:
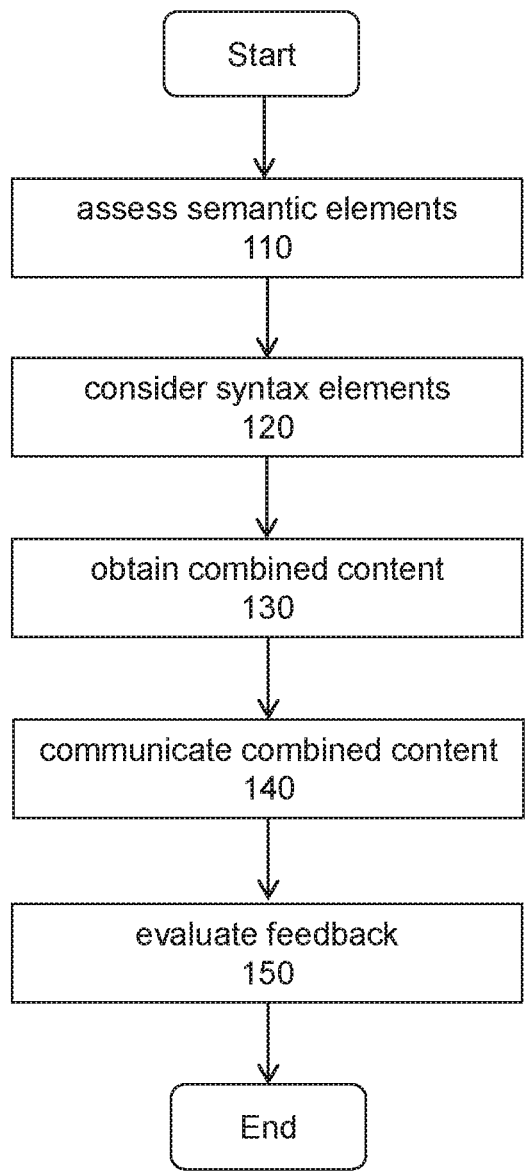
FIG. 1 illustrates a flowchart of computer system method steps according to the invention.

FIG. 1 illustrates a flowchart of computer system method steps for generating content including words from at least two different languages. Content including words from at least two different languages is generated by first receiving input of a language a user is fluent—referred to as fluent language—and a language the user wishes to learn, or the language the user is not fluent—referred to as not fluent language. Text from each of the languages—fluent and not fluent—is aligned by assessing one or more semantic elements of the text (step 110). It is noted that the invention is discussed with respect to text for exemplary purposes only as the invention may apply to audio or video modalities.

Semantic elements are directed to the meaning of words and systematic organization of sounds in languages. Statistical machine translation (SMT) is used to align translations on the basis of statistical models whose parameters are derived from the analysis of bilingual text corpora. Text from the fluent language and not fluent language are aligned at one or more of the sentence, phrase and word level. Suppose a user is fluent in English and wants to learn French. For the bi-text pair (E, F) English text is aligned with French text. As an example, English words $w_e \in E$ are aligned with French words $w_f \in F$; however, English sentences or phrases may be aligned with French sentences or phrases respectively. It is noted that the invention is described with respect to English/French languages for exemplary purposes only. Any two or more languages are contemplated.

Syntax elements of the aligned text are considered in order to select text of not fluent language to combine with the fluent language text (step 120). Syntax refers the arrangement of words and phrases to create well-formed content such as sentences in the fluent language. The position of the selected text within the fluent language text is determined, for example, the beginning of a sentence, the middle or the end of a sentence. Where the selected text is positioned is determined by maximizing a recall probability value of the selected text from context. Combined content is obtained by fusing the text of the two or more languages together (step 130). Specifically, the selected text replaces a portion of the fluent language text. The combined content is communicated to a user (step 140). The combined content may be communicated in a variety of ways, for example, visually such as using a touch screen or aurally such as using a speaker.

The user provides feedback, which is received by the system and evaluated to determine an actual recall probability value of the not fluent language of the user (step 150). Specifically, the recall probability value and the actual recall probability value are compared in order to adjust the recall probability value based on the actual recall probability value. Feedback provided by the user and received by the system includes, for example, selection of an input, self-paced or controlled reading speed, number of page turns within a specified period of time, eye-tracking such as gaze saccades, and facial expression monitoring. Feedback provides a cue to the comprehension of the combined content and is used to tailor the combined content communicated to the user quickly such as in real-time. Feedback maximizes the performance for each specific user to obtain personalized language learning with increased efficiency.

Figure 2:
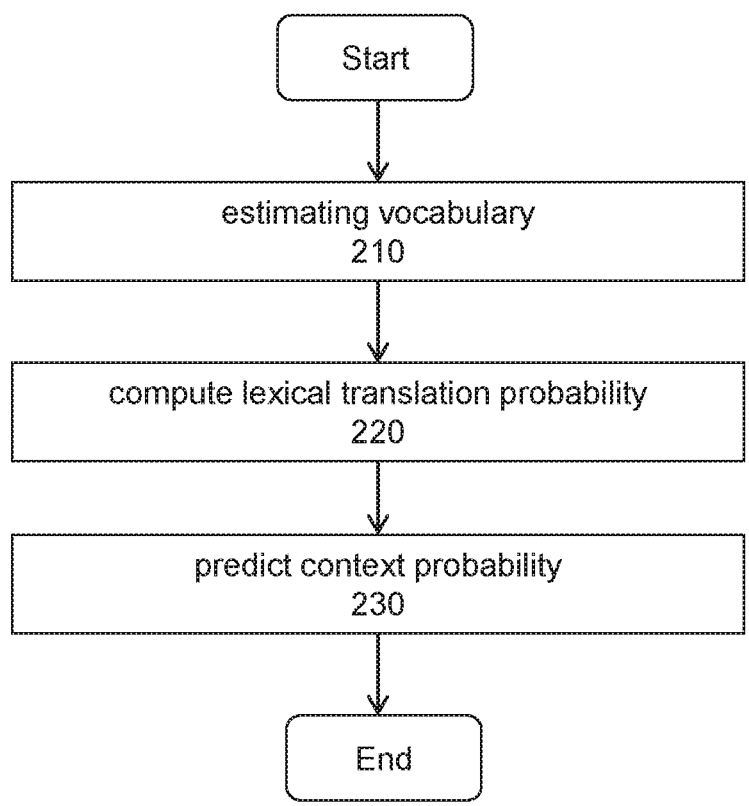
FIG. 2 illustrates a flowchart of computer system method steps according to the invention.

FIG. 2 illustrates a flowchart of computer system method steps of maximizing a recall probability value of the not fluent language from context. The learnability—likelihood of retaining certain text—of a word in the not fluent language is identified by the recall probability value $\Pr(w_e, w_f)$. The invention maximizes the learnability of the not fluent language estimating a vocabulary of a user (step 210) and presenting code-switched content most suitable for the user. Vocabulary of a user is estimated through simple frequency based sampling of the terms in the vocabulary of the language in which the user is not fluent. After presentation of words, the system determines whether or not the user is familiar with the word in terms of meaning. For example, a user may provide explicit feedback, i.e. be required to select input such as "known" and "unknown". Or the user may provide implicit feedback, through reading speed, page turns or gaze saccades. This process allows the system to estimate the recall probability $Pr(w_f)$ for each word $w_f$ in the vocabulary of the language in which the user is not fluent. The estimated recall probability $Pr(w_f)$ is used in the optimization stage to produce combined content personalized to the user.

The recall probability value $Pr(w_e, w_f)$ is factorized as follows: $Pr(w_e, w_f) = Pr(w_e|w_f)Pr(w_e|context)$, where $Pr(w_e|w_f)$ is the lexical translation probability between $w_e$ and $w_f$ (step 220). In one embodiment, the lexical translation probability may be obtained using IBM model 4. The probability of $w_e$ in the context of the sentence where $w_e$ appears is identified by $Pr(w_e|context)$. The probability may be computed in a number of ways that incorporate the degree of the word's "guessability" in the content. These features include (but are not limited to) a linear combination of a tri-gram language model and the normalized latent semantic analysis (LSA) term-term similarity.

In the spirit of traditional SMT terminology, code-switched decoding will refer to the process of finding the optimal code-mixed translation of the combined content. Like SMT decoding, code-mixed decoding is NP-Complete, and thus practically, can be solved with exact methods such as Integer Linear Programming, or with an approximate method, e.g. a greedy algorithm. Following the computation $\phi_i$ for the word pair $(w_e, w_f)$, the task is to select a switch-set of 0 or more words $S_i \subset W_i$ for a sentence $s_i = \{w_{ij}|w_{ij} \in W_i\}$, that are code-switched, such that the sequence $S_1, S_2 \ldots S_N$ is optimal in some defined learnability objective of the user. Thus, formally stated, the code-switching problem is $S_1, S_2 \ldots S_N = \mathrm{argmax}\ f(S_1, S_2 \ldots S_N)$, where $f(\cdot)$ is a function that correlates with the total "learnability" of the text. Ideally $f(\cdot)$ captures the user's recall and retention of the words in the set $S_1 \cup S_2 \ldots \cup S_N$ after reading the code-switched text. $Pr(w_i)$ The recall probability is conditioned on the feature $\phi_i$ for word $w_i$ and may combine the tightness of the contextual constraint and its syntactic alignment between two or more languages. A state is maintained for each word in the vocabulary $w \in V$ that is an estimate of the posterior recall probability of the word following its observation. Initializing the optimization at the first sentence leads to a natural progression in the mixture density of the two or more languages, as newly learned words bootstrap new vocabulary.

Following is an example of English-Spanish combined content that may be output by the system according to the invention. It is noted that any code-mixed text is contemplated, for example, English-Russian combined content. Combined text is generated and presented to a user such as code-mixed text in English-Spanish pairs with a smaller percentage of accepted alignments, and consequently code-mixed text of lesser density. For example:

In the libro it said Boa constrictors traga their prey whole without chewing it. After that they are not able to move and they sleep through the seis months that they need for digestion. I pondered deeply then over the adventures of the jungle And after some work with a colored pencil I succeeded in making my first dibujo. My dibujo Number One It looked like this.

In particular, however, it is expected that the words code-switched are intuited from the context. Continuing the optimization past the last example sentence, it is also expected that the number of code-switched words grows, bootstrapped from the earlier words in the code-switched text. Again, it is noted that the invention is discussed with respect to text relative to only one embodiment of the invention as the invention may be applicable to audio or video modalities.

Figure 3:
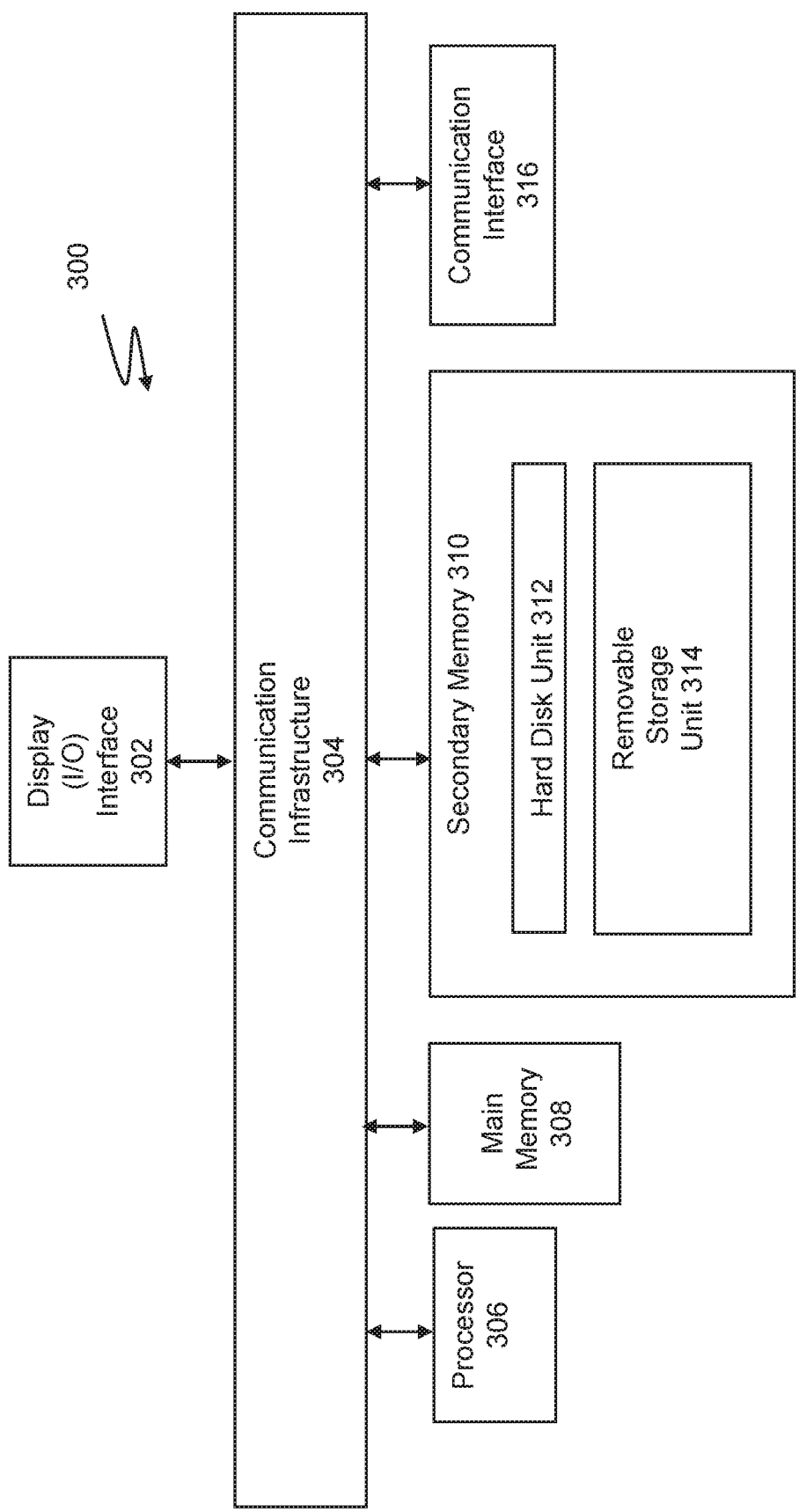
FIG. 3 illustrates an exemplary computer system that may be used to implement the method steps according to the invention.

FIG. 3 illustrates an exemplary computer system that may be used to implement the programs according to the invention. Computer system 300 includes an input/output display interface 302 connected to communication infrastructure 304—such as a bus—, which forwards data such as graphics, text, and information, from the communication infrastructure 304 or from a frame buffer (not shown) to other components of the computer system 300. The input/output display interface 302 may be, for example, a keyboard, touch screen, joystick, trackball, mouse, monitor, speaker, printer, Google Glass® unit, web camera, any other computer peripheral device, or any combination thereof, capable of entering and/or viewing data.

Computer system 300 includes one or more processors 306, which may be a special purpose or a general-purpose digital signal processor configured to process certain information. Computer system 300 also includes a main memory 308, for example random access memory (RAM), read-only memory (ROM), mass storage device, or any combination thereof. Computer system 300 may also include a secondary memory 310 such as a hard disk unit 312, a removable storage unit 314, or any combination thereof. Computer system 300 may also include a communication interface 316, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 308, secondary memory 310, communication interface 316, or a combination thereof, function as a computer usable storage approach, otherwise referred to as a computer readable storage approach, to store and/or access computer software including computer instructions. For example, computer programs or other instructions may be loaded into the computer system 300 such as through a removable storage device, for example, a floppy disk, ZIP disks, magnetic tape, portable flash drive, optical disk such as a CD or DVD or Blu-ray, Micro-Electro-Mechanical Systems (MEMS), nanotechnological apparatus. Specifically, computer software including computer instructions may be transferred from the removable storage unit 314 or hard disc unit 312 to the secondary memory 310 or through the communication infrastructure 304 to the main memory 308 of the computer system 300.

Communication interface 316 allows software, instructions and data to be transferred between the computer system 300 and external devices or external networks. Software, instructions, and/or data transferred by the communication interface 316 are typically in the form of signals that may be electronic, electromagnetic, optical or other signals capable of being sent and received by the communication interface 316. Signals may be sent and received using wire or cable, fiber optics, a phone line, a cellular phone link, a Radio Frequency (RF) link, wireless link, or other communication channels.

Computer programs, when executed, enable the computer system 300, particularly the processor 306, to implement the methods of the invention according to computer software including instructions.

The computer system 300 described herein may perform any one of, or any combination of, the steps of any of the methods presented herein. It is also contemplated that the methods according to the invention may be performed automatically, or may be invoked by some form of manual intervention.

The computer system 300 of FIG. 3 is provided only for purposes of illustration, such that the invention is not limited to this specific embodiment. It is appreciated that a person skilled in the relevant art knows how to program and implement the invention using any computer system.

The computer system 300 may be a handheld device and include any small-sized computer device including, for example, a personal digital assistant (PDA), smart hand-held computing device, cellular telephone, or a laptop or netbook computer, hand held console or MP3 player, tablet, or similar hand held computer device, such as an iPad®, iPad Touch® or Phone®.

The described embodiments are to be considered in all respects only as illustrative and not restrictive, and the scope of the invention is not limited to the foregoing description. Those of skill in the art may recognize changes, substitutions, adaptations and other modifications that may nonetheless come within the scope of the invention and range of the invention.

The invention claimed is:

1. A computer program stored in one or more non-transitory computer-readable mediums for generating code-switched content including words from at least two different languages, the computer program comprising instructions for performing the steps of:
 (a) receiving by a processor a first input of a first language a user is fluent and a second input of a second language the user is not-fluent;
 (b) generating by the processor content including a first language text based on the first input and a second language text based on the second input;
 (c) aligning by the processor words of the first language text with a meaning the same as words of the second language text determined by a statistical machine translation (SMT) with parameters derived from bilingual text corpora, wherein a word $\omega_e$ of the first language has a meaning that is the same as a word $\omega_f$ of the second language wherein the aligning step is;
 (d) presenting on a display interface the word $\omega_f$ of the second language;
 (e) receiving by the processor initial feedback from the user;
 (f) calculating by the processor, based on the initial feedback, a recall probability value $Pr(\omega_e, \omega_f)$ of a word pair $(\omega_e, \omega_f)$;
 (g) selecting by the processor one or more words of the second language that have a maximum recall probability value;
 (h) replacing a portion of the first language text with the one or more selected words of the second language to obtain combined content;
 (i) presenting to the user the combined content as one or more selected from the group of: an audio stimulus, a graphic stimulus via the display interface, or a video stimulus via the display interface;
 (j) receiving by the processor feedback from the user, wherein the feedback determines an actual recall probability value of each of the one or more selected words of the second language;
 (k) updating the recall probability value of each of the one or more selected words of the second language with the actual recall probability value; and
 (l) repeating steps (g)-(k).

2. The computer program stored in one or more non-transitory computer-readable mediums for generating code-switched content including words from at least two different languages according to claim 1, wherein the replacing step further comprises the steps of:
 estimating a vocabulary of the user;
 computing a lexical translation probability between a word of the first language text and a word of the second language text; and
 predicting a context probability of the one or more selected words of the second language appearing in the combined content.

3. The computer program stored in one or more non-transitory computer-readable mediums for generating code-switched content including words from at least two different languages according to claim 1, wherein the first language text is a sentence.

4. The computer program stored in one or more non-transitory computer-readable mediums for generating code-switched content including words from at least two different languages according to claim 1, wherein the first language text is a phrase.

5. The computer program stored in one or more non-transitory computer-readable mediums for generating code-switched content including words from at least two different languages according to claim 1, wherein the first language text is a word.

6. The computer program stored in one or more non-transitory computer-readable mediums for generating code-switched content including words from at least two different languages according to claim 1, wherein the feedback is implicit feedback in the form of gaze saccades.

7. The computer program stored in one or more non-transitory computer-readable mediums for generating code-switched content including words from at least two different languages according to claim 1, wherein the recall probability value is factorized according to the following: $Pr(\omega_e, \omega_e)$ =$Pr(\omega_e|\omega_f)Pr(\omega_e|context)$, where $Pr(\omega_e|\omega_f)$ is a lexical translation probability between $\omega_e$ and $\omega_f$, and $Pr(\omega_e|context)$ is a probability of $\omega_e$ in the context of the sentence where $\omega_e$ appears.

8. The computer program stored in one or more non-transitory computer-readable mediums for generating code-switched content including words from at least two different languages according to claim 7, wherein the probability of $\omega_e$ in the context of the sentence where $\omega_e$ appears is computed using a linear combination of a tri-gram language model and a normalized latent semantic analysis (LSA) term-term similarity.

9. The computer program stored in one or more non-transitory computer-readable mediums for generating code-switched content including words from at least two different languages according to claim 1, wherein the first language is English.

10. The computer program stored in one or more non-transitory computer-readable mediums for generating code-switched content including words from at least two different languages according to claim 1, wherein the feedback determines whether or not the user knows the meaning of the word $\omega_f$ of the second language and the feedback is one or more selected from the group of: a selection of an input, a self-paced or controlled reading speed, a number of page turns within a specified period of time, an eye-tracking such as gaze saccades, and facial expression monitoring.

11. The computer program stored in one or more non-transitory computer-readable mediums for generating code-switched content including words from at least two different languages according to claim 1, wherein the display interface comprises one or more selected from the group of: a touch screen, a joystick, a trackball, a monitor, a speaker, a printer, a Google Glass® unit, a computer peripheral device capable of entering and/or viewing data, or any combination thereof.

12. The computer program stored in one or more non-transitory computer-readable mediums for generating code-switched content including words from at least two different languages according to claim 1, wherein the selecting step further comprises the step of using the maximum recall probability value to determine a position for the one or more words of the second language.

13. The computer program stored in one or more non-transitory computer-readable mediums for generating code-switched content including words from at least two different languages according to claim 12, wherein the position of the first language text is at a beginning of a sentence, a middle of a sentence, or an end of a sentence.

* * * * *